US008926463B1

(12) United States Patent  
Eldor (10) Patent No.: US 8,926,463 B1  
(45) Date of Patent: Jan. 6, 2015

(54) DRIVE MECHANISM FOR A CAGE IN A SPIRAL CONVEYOR BELT SYSTEM

(75) Inventor: Niv Eldor, South Setauket, NY (US)

(73) Assignee: Tarpaulin.com, Inc., Woodbury, NY (US)

( * ) Notice: Subject to any disclaimer, the term of this patent is extended or adjusted under 35 U.S.C. 154(b) by 522 days.

(21) Appl. No.: 13/231,617

(22) Filed: Sep. 13, 2011

Related U.S. Application Data (60) Provisional application No. 61/382,201, filed on Sep. 13, 2010.

(51) Int. Cl.  
*F16H 7/00* (2006.01)

(52) U.S. Cl.  
USPC .......................................................... 474/148

(58) Field of Classification Search  
USPC ........... 474/148, 151–165; 242/397; 198/178, 198/781.03, 781.04, 831, 848, 849; 212/175–181, 247  
See application file for complete search history.

(56) References Cited

U.S. PATENT DOCUMENTS

| 4,078,655 A | 3/1978 | Roinestad |
| 4,111,064 A * | 9/1978 | Purcell .......................... 474/162 |
| 4,866,354 A * | 9/1989 | Miller ............................. 318/67 |
| 4,941,566 A | 7/1990 | Irwin |
| 5,133,449 A | 7/1992 | Spangler |
| 5,191,267 A * | 3/1993 | Machacek ....................... 318/67 |
| 5,393,134 A * | 2/1995 | Oertley .......................... 305/199 |
| 5,398,521 A * | 3/1995 | Baron et al. ..................... 62/381 |
| 6,394,261 B1 | 5/2002 | DeGennaro |
| 6,523,677 B1 | 2/2003 | DeGennaro et al. |
| 2005/0092585 A1 * | 5/2005 | Nelson et al. .............. 198/844.1 |

* cited by examiner

*Primary Examiner* — William E Dondero  
*Assistant Examiner* — Robert T Reese  
(74) *Attorney, Agent, or Firm* — Hoffmann & Baron, LLP (57) ABSTRACT

A drive mechanism for a cage in a spiral conveyor belt system including a plurality of tooth segments secured to a drive ring and positioned to define a substantially constant pitch diameter. The drive ring may be formed from a plurality of discrete pie plates positioned adjacent each other and arranged in a substantially circular format around the cage.

14 Claims, 15 Drawing Sheets

DRIVE MECHANISM FOR A CAGE IN A SPIRAL CONVEYOR BELT SYSTEM

This application claims the benefit of U.S. Provisional Application Ser. No. 61/382,201 filed Sep. 13, 2010, the disclosure of which is hereby incorporated by reference in their entirety.

BACKGROUND OF THE INVENTION

The present invention relates to drive mechanisms for conveyor belt systems and, more particularly, to a drive mechanism for a cage used in a spiral conveyor belt system.

Spiral conveyor belt systems are well-known in the art. They are commonly used in applications where it is desired to keep an item moving for an extended period of time within a contained environment, e.g., a product traveling through a refrigeration zone for cooling. As will be recognized by those skilled in the art, a spiral system typically consists of an endless conveyor belt traveling through concentric stacked helical paths whereby an item travels upward in elevation along the helical paths and/or downward in elevation along the helical paths.

Spiral systems typically utilize a cage (sometimes known as a "drum") for driving the conveyor belt. More particularly, the cage is centrally positioned within the helical path, and includes a plurality of circumferentially-spaced vertical driving bars which contact the inner edge of the belt to impart a driving force thereto.

In many applications, the cage extends from and is supported by a centrally-located shaft. In turn, the shaft is rotatably supported upon a stationary frame. A drive mechanism is connected to the cage, and rotates the cage with respect to the frame. As the drive mechanism turns the cage, the cage contacts/drives the belt through the helical pathway of the conveyor belt system. Smaller cages often times utilize a center drive mechanism which directly communicates with the center shaft, resulting in rotation of the cage. Larger cages typically utilize a chain and tooth arrangement whereby the chain extends around the circumference of the cage and engages teeth located on the circumference of such cage. The chain in turn communicates with a drive motor.

Those skilled in the art will appreciate that prior art cages are typically constructed by welding together a plurality of individual pieces. This type of construction is time consuming, costly and requires tremendous levels of skill to ensure the "roundness" of the assembled cage. It will be appreciated that the roundness of a cage will affect the smoothness of the rotation, the engagement of the cage with the belt, and the engagement of the teeth on the cage with drive chain.

Prior art cages utilizing a chain and tooth arrangement typically mount the tooth segments on a vertically-extending outer wall of the cage. More particularly, the teeth are typically welded to an arcuate plate sized to be secured to the outer vertical wall of the cage. This type of arrangement, however, provides limited flexibility in installing the tooth segments to compensate for the "out-of-roundness" of the cage itself. Moreover, the tooth segment assemblies themselves may have issues with tolerances, which will also affect the smoothness of the rotation of the cage. Finally, the normal "stretching" which occurs in a chain after periods of operation often require substantial and costly modifications/remarks to the prior art cage.

There is therefore a need in the art for an improved drive mechanism for driving larger-sized cages in a spiral conveyor belt system. There is a further need in the art for a drive mechanism which can compensate for the "out-of-roundness" of the cage, and which can eliminate the hand fitting of tooth segments, and the welding and drilling associated therewith during both initial installation and normal maintenance due to "stretching" of the chain.

SUMMARY OF THE INVENTION

The present invention, which addresses the needs of the prior art, relates to a drive mechanism for a cage in a spiral conveyor belt system. The mechanism includes a motor. The mechanism further includes a roller chain communicating with the motor and extending around the cage. The mechanism further includes a plurality of discrete pie plates positioned adjacent each other and arranged in a substantially circular format about the cage. The pie plates are secured to the cage to define a drive ring. The mechanism further includes a plurality of tooth segments secured to the drive ring. Each of the tooth segments has a plurality of drive teeth sized to engage the chain. The tooth segments are positioned to define a substantially constant pitch diameter.

The present invention further relates to a drive mechanism for a cage in a spiral conveyor belt system including a motor, a roller chain communicating with the motor and extending around the cage, a drive ring extending around the cage, and a plurality of tooth segments secured to the drive ring. Each of the tooth segments has a plurality of drive teeth sized to engage the chain. The tooth segments are positioned to define a substantially constant pitch diameter. The drive ring defines a segmented pathway around the cage wherein the tooth segments extend from the drive ring whereby the chain extends between adjacent tooth segments without contacting the drive ring or the cage.

Finally, the present invention relates to a drive mechanism for a cage in a spiral conveyor belt system including a motor, a double-row roller chain communicating with the motor and extending around the cage, a plurality of discrete of upper pie plates positioned adjacent each other and arranged in a substantially circular format about the cage, a plurality of discrete lower pie plates positioned adjacent each other and arranged in a substantially circular format about the cage and a plurality of tooth segments secured between the upper and lower pie plates. The pie plates are secured to the cage. Each of the tooth segments has a plurality of drive teeth sized to engage the chain. The tooth segments are positioned to define a substantially constant pitch diameter.

As a result, the present invention provides an improved drive mechanism for driving larger size cages in a spiral conveyor belt system. The drive mechanism compensates for "out-of-roundness" of the cage, and eliminates the hand fitting of tooth segments, and the welding and drilling associated therewith during both initial installation and normal maintenance due to "stretching" of the chain.

DETAILED DESCRIPTION OF THE INVENTION

Referring to FIGS. 1 to 8, a cage 10 for use with a spiral conveyor belt system is shown. Cage 10 extends from, and is supported by, a centrally-located shaft 12. In turn, shaft 12 is rotatably supported upon a stationary frame 14. A motor 16 drives a roller chain 18 which extends around the outer circumference of cage 10, and turns cage 10 when driven by motor 16.

In one preferred embodiment, cage 10 includes a plurality of spokes 20 extending horizontally outward from the lower end of shaft 12. A vertically-extending post 22 is located near the radially-outward end of each of spokes 20. A circumferentially-extending flange 24 surrounds posts 22, and is connected to posts 22 by a plurality of brackets 26 (see FIG. 4). A plurality of circumferentially-spaced vertical uprights 28 (which define a "drive circle") are secured to flange 24 via bolts 30 and nuts 32 (see FIG. 7). It is contemplated herein that cage 10 includes a second set of spokes extending from the upper end of shaft 12, such spokes being connected to the upper ends of posts 22. Depending on the height and design of the cage, additional set of spokes may be located between the upper and lower sets of spokes. As will be understood by those skilled in the art, a conveyor belt (not shown) can be helically arranged outside of the cage, and is driven through contact (e.g., frictional engagement) between the vertical uprights of the cage and the inner edges of the belt.

The components used to assemble cage 10 are preferably precut and predrilled to allow assembly with little to no welding necessary during installation. This not only reduces installation costs, but results in a cage having a truer and more accurate drive circle. Of course, the design and configuration of the spokes, posts, flange and uprights can vary based on the requirements of the cage.

In one preferred embodiment, cage 10 is formed as a weldless cage. More particularly, the cage is formed as a plurality of modular components which can be assembled in the field with little to no welding. This substantially decreases the time and cost associated with assembling a spiral conveyor belt system in the field, and also provides more consistency in the final "roundness" of the assembled cage. In other words, the use of precut and or predrilled components formed using manufacturing processes such as CNC milling with water jet and/or laser reduces/eliminates tolerances associated with welding and on-the-job assembly.

As mentioned hereinabove, a chain 18 extends around the outer circumference of cage 10, and together with motor 16, can be used to turn the cage, and thereby drive the conveyor belt. As will be appreciated by those skilled in the art, the design of the chain/cage engagement is important to ensure smooth operation of the system, and to facilitate both the initial installation and subsequent maintenance of such system. In this regard, the present invention provides a novel chain/cage design which ensures smooth operation of the system by providing an accurate and "true" chain-engagement circle, which facilitates installation by reducing the need for drilling, fitting and welding of gear teeth components, and which provides adjustability to compensate for the normal stretching of a roller chain over time.

Figure 1:
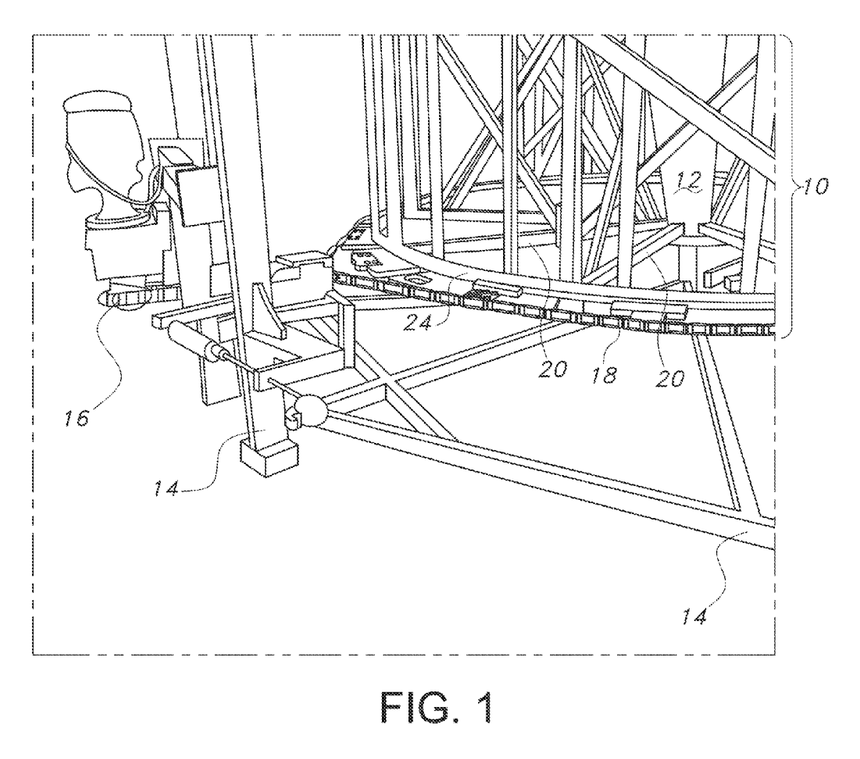
FIG. 1 is a perspective view of a cage for a spiral conveyor belt system formed in accordance with a first embodiment of the present invention.
Figure 2:
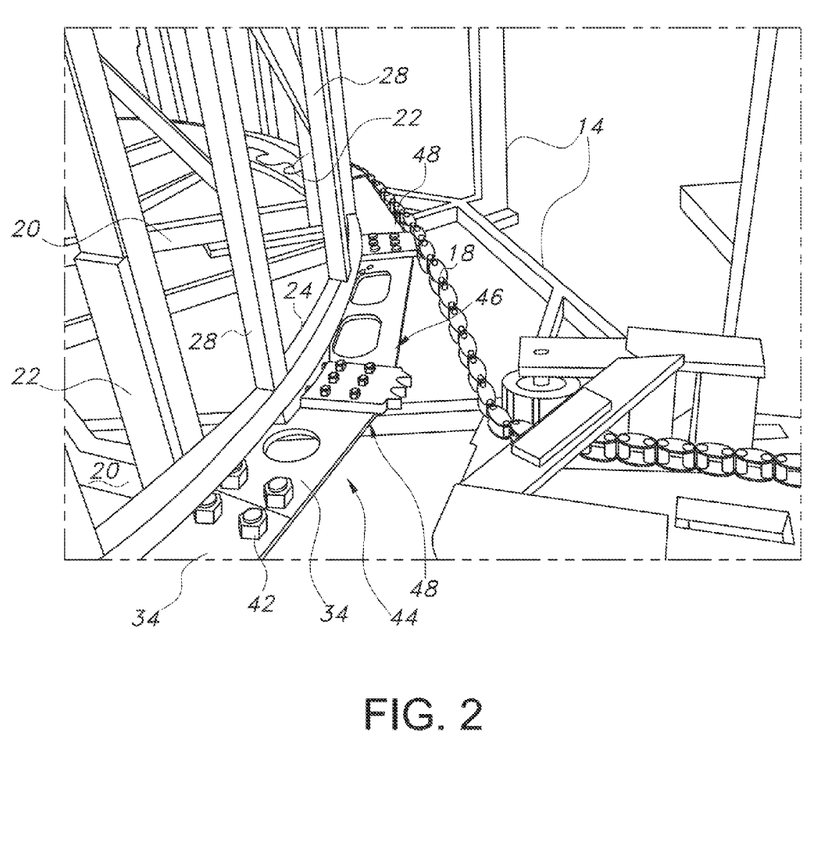
FIG. 2 is another perspective view of the first embodiment of the present invention.
Figure 3:
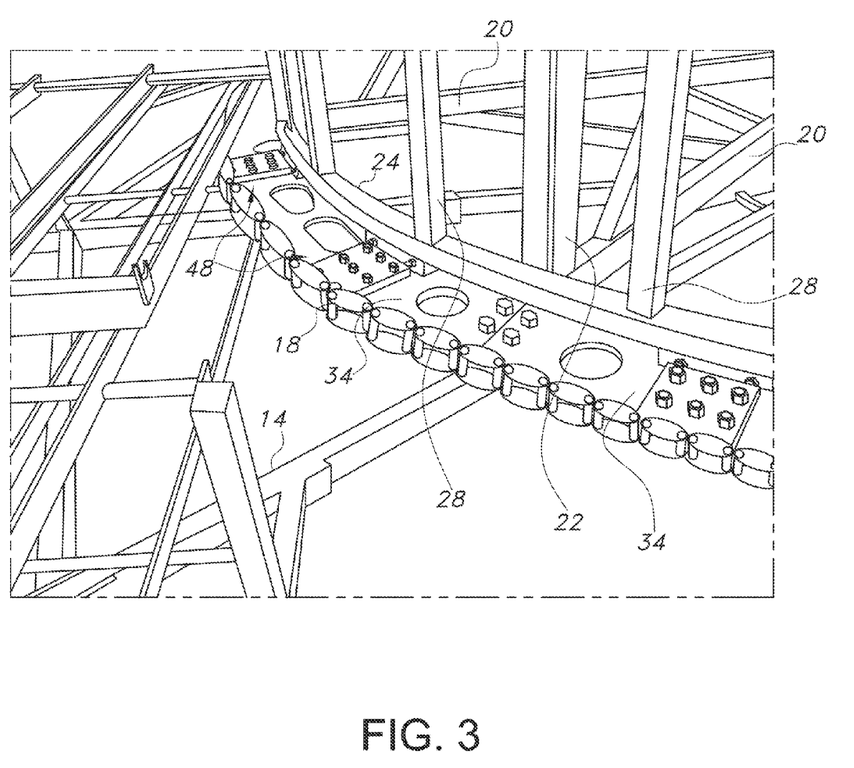
FIG. 3 is still another perspective view of the first embodiment of the present invention.
Figure 4:
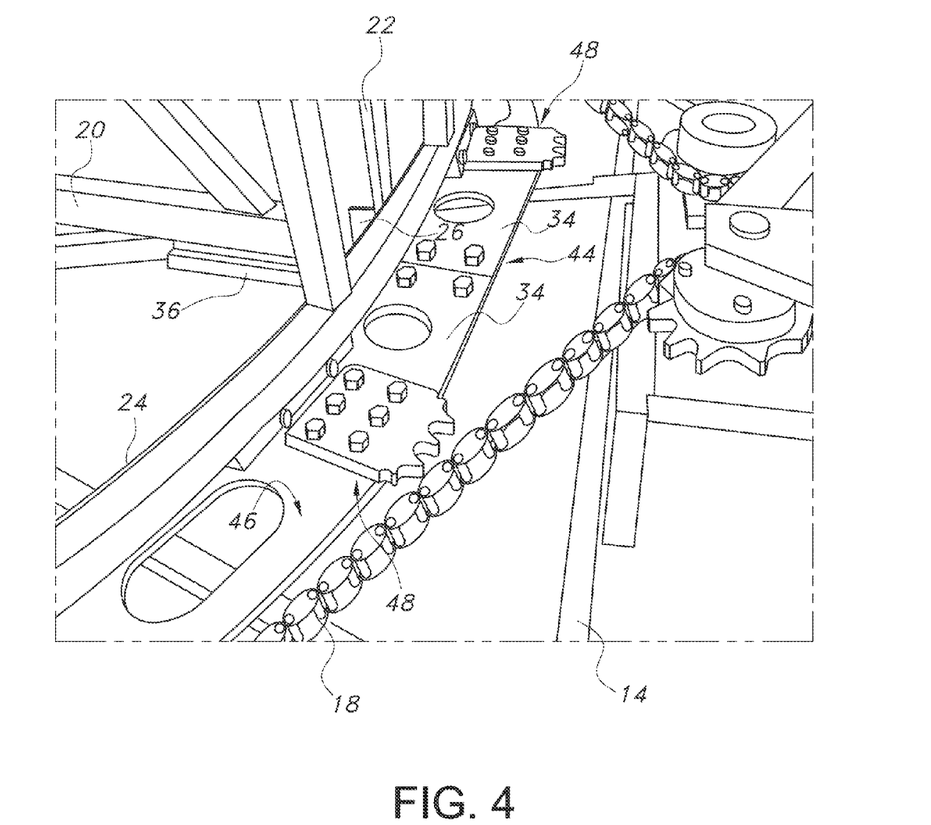
FIG. 4 is yet another perspective view of the first embodiment to the present invention.
Figure 5:
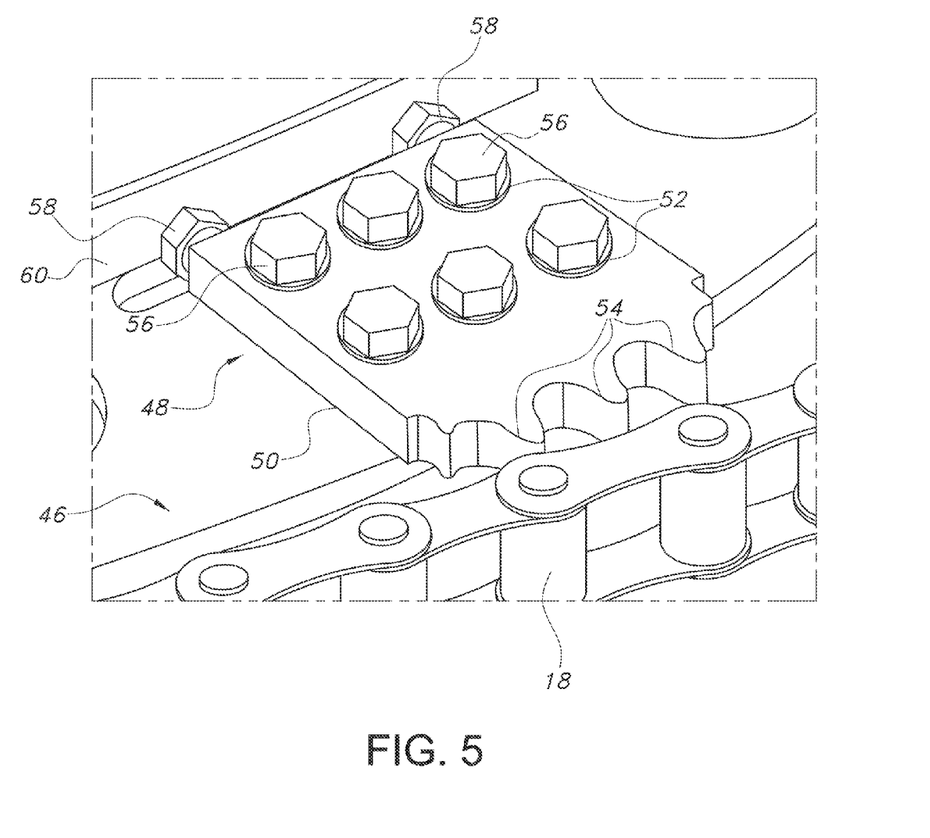
FIG. 5 is an enlarged detail of a tooth segment disengaged from the roller chain in accordance with the first embodiment of the present invention.
Figure 6:
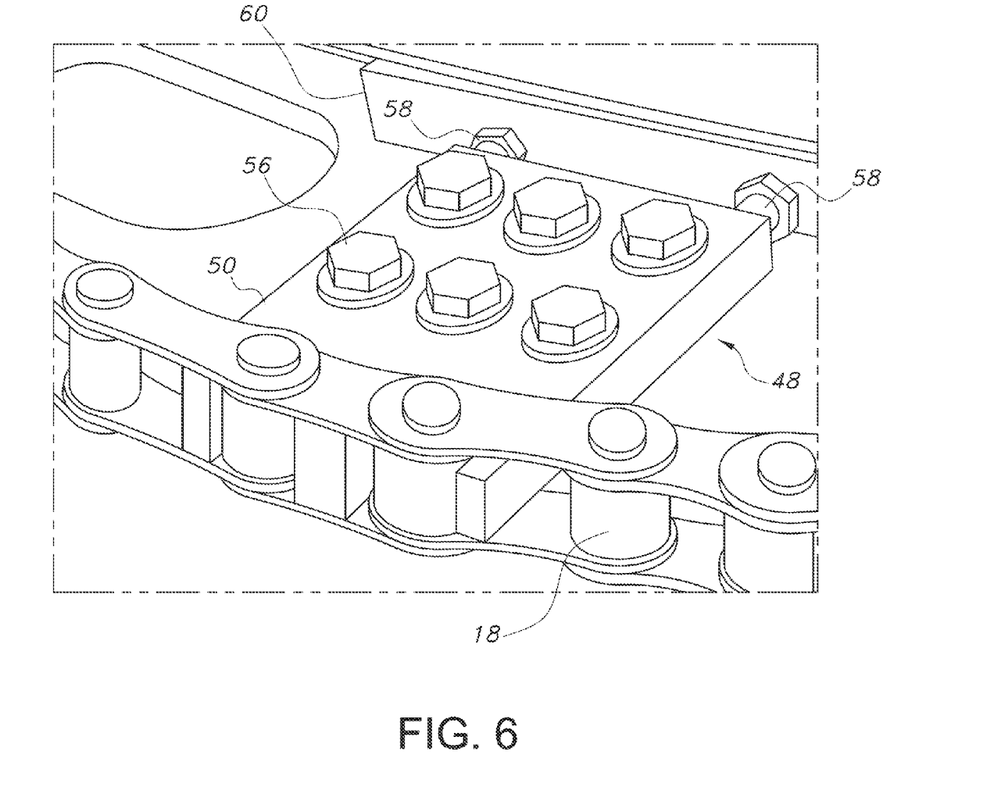
FIG. 6 is an enlarged detail of a tooth segment engaged with the roller chain in accordance with the first embodiment of the present invention.
Figure 7:
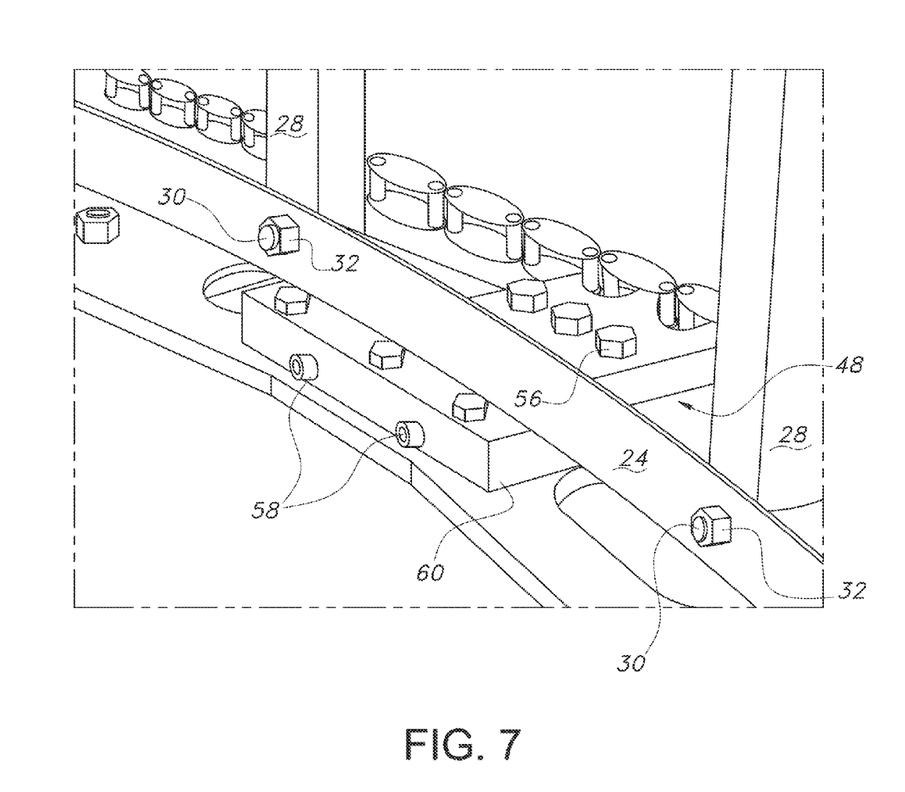
FIG. 7 is a perspective view from inside the cage of the first embodiment of the present invention looking radially outward at a tooth segment, a jack screw plate and roller chain.
Figure 8:
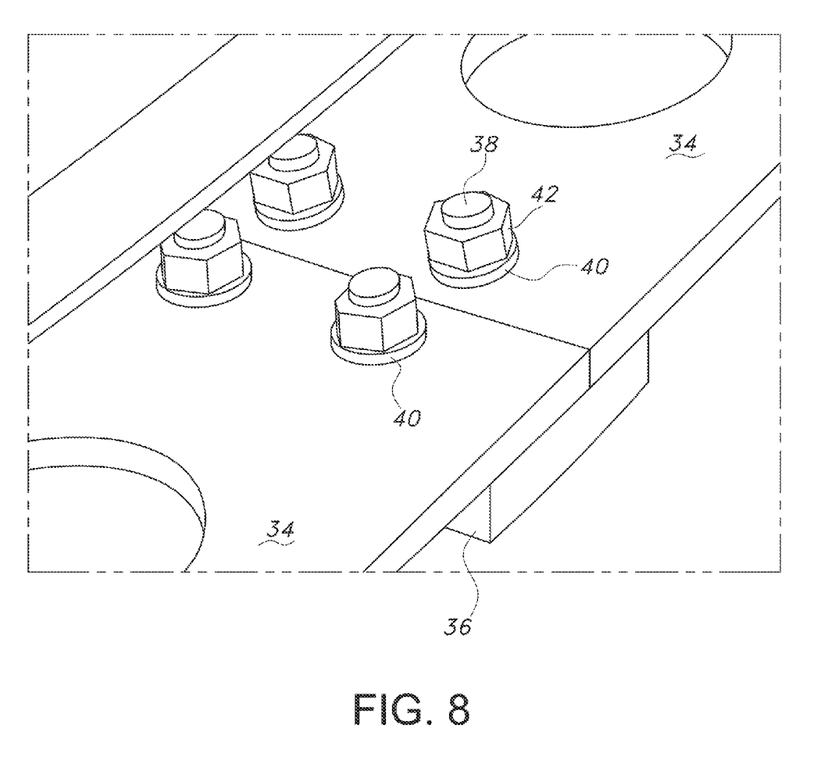
FIG. 8 is an enlarged detail showing attachment of the pie plates to a portion of a spoke in accordance with the first embodiment to the present invention.

To achieve these goals, the present invention utilizes a plurality of pie plates 34, which are preferably formed using a CNC milling process or other accurate manufacturing process. The pie plates, when laid out and butted together, define an accurate and true circle. In the embodiment shown in FIGS. 1 to 8, the pie plates rest upon and are supported by extension arms 36 attached to the underside of each spoke 20. As best seen in FIG. 4, extension arms 36 are welded or otherwise attached to the underside of spokes 20. The pie plates rest upon extension arms 36, and are through-bolted to extension arms 36 via bolts 38, lock washers 40 and nuts 42, thus forming drive ring 44. Drive ring 44 includes a surface 46 which is substantially perpendicular to vertical uprights 28 and to the outer circumference of the cage.

The present invention contemplates the installation of a plurality of tooth segments 48 positioned around the circumference of cage 10. Each of tooth segments 48 includes a substantially rectangular body portion 50 having a plurality of slotted apertures 52 therethrough. Tooth segments 48 also include a plurality of drive teeth 54 located along one edge thereof. Tooth segments 48 may be made from materials including steel, and are preferably formed using a CNC milling process. Moreover, the design of discreet tooth segments 48 as described herein allows such tooth segments to be readily removed/replaced whenever necessary for system maintenance and/or repair.

More particularly, each of tooth segments is secured to drive ring 44, preferably to surface 46 of drive ring 44. Tooth segments 48 are secured to drive ring 44 by mechanical hardware, e.g., bolts 56 which pass through apertures (not shown) formed in the pie plates. Apertures in the pie plates are preferably predrilled at the time of manufacture, thus ensuring the accuracy of the placement of the tooth segments around the circumference of the cage. Each of tooth segments 48 is provided with an adjustment mechanism, e.g., jacks screws 58 located within a jack block 60. The jack screws allow adjustment of the tooth segments to "fine tune" the pitch diameter of the teeth 54 positioned around the circumference of the cage. This in turn ensures the smoothness of the rotation of such cage.

It has been discovered herein that the novel design of the present invention, which allows adjustment of the pitch diameter defined by teeth 54, facilitates system maintenance and long term operation. This aspect of the present invention can best be understood by referring to FIG. 3. As discussed, tooth segments 48 are evenly spaced around the circumference of the cage such that the teeth define a pitch diameter. The distance between adjacent tooth segments is constant and fixed, and is selected such that the pitch diameter defined by teeth 48 receives and engages chain 18. As will be understood by those skilled in the art, a roller chain will "stretch" over time due to the normal wear experienced by the chain. This means that the length of chain extending between adjacent tooth segments is now greater than the distance defined by such tooth segments, resulting in "sloppy" engagement, vibration, and/or disengagement of the chain from the teeth. In contrast to prior art designs (which require the disassembly of the teeth and the installation of spacers thereunder), the present system allows the pitch diameter to be increased (via jack screws 58) to compensate for the stretching in the chain without the need for disassembly of the system components and/or fitting of spacers.

Drive ring 44 thus defines a segmented pathway around the outer circumference of the cage. This allows chain 18 to extend from tooth segment to tooth segment without contacting the drive ring or any other portion of the cage. As a result, the pitch diameter is controlled by the location of the tooth segments 48, and any "out-of-roundness" of the actual cage is not "felt" by the drive chain. It has been discovered herein that eliminating contact of the drive chain with the cage (with the exception of the contact with tooth segments 24) reduces the transmission of vibration between the chain and the cage, thus resulting in a smoother, more uniform rotation of the cage. This in turn provides a smoother more uniform driving force for the conveyor belt.

It is contemplated herein that existing spiral conveyor belt systems can be retrofitted to improve the performance thereof by installing a drive ring of pie plates and a plurality of tooth segments as described hereinabove. Of course, the retrofitting of an existing cage may require drilling, cutting, welding or other such modifications to allow for the installation of the pie plates about the circumference of the cage.

Figure 9:
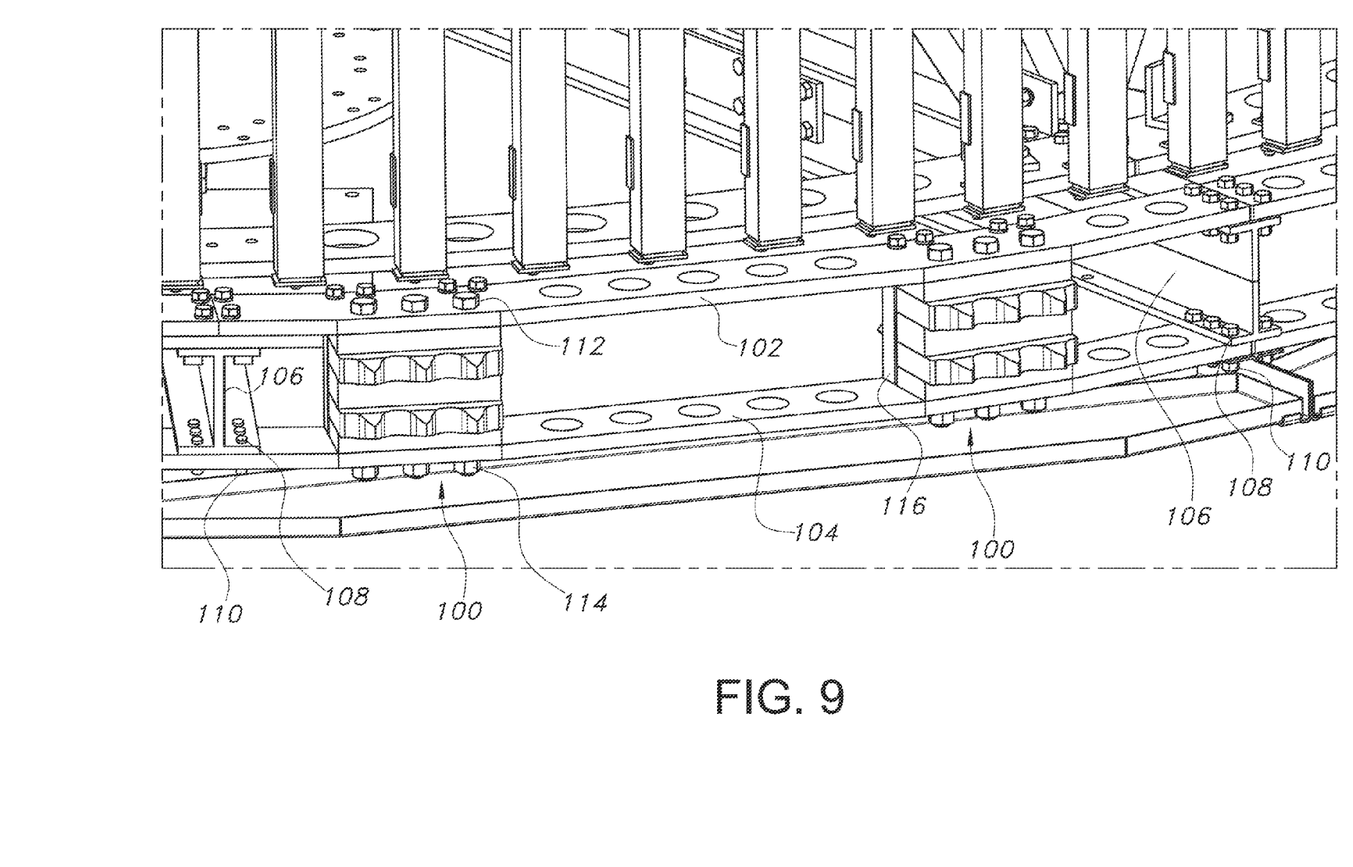
FIG. 9 is a perspective view of a portion of a cage for a spiral conveyor belt system formed in accordance with a second embodiment of the present invention.
Figure 10:
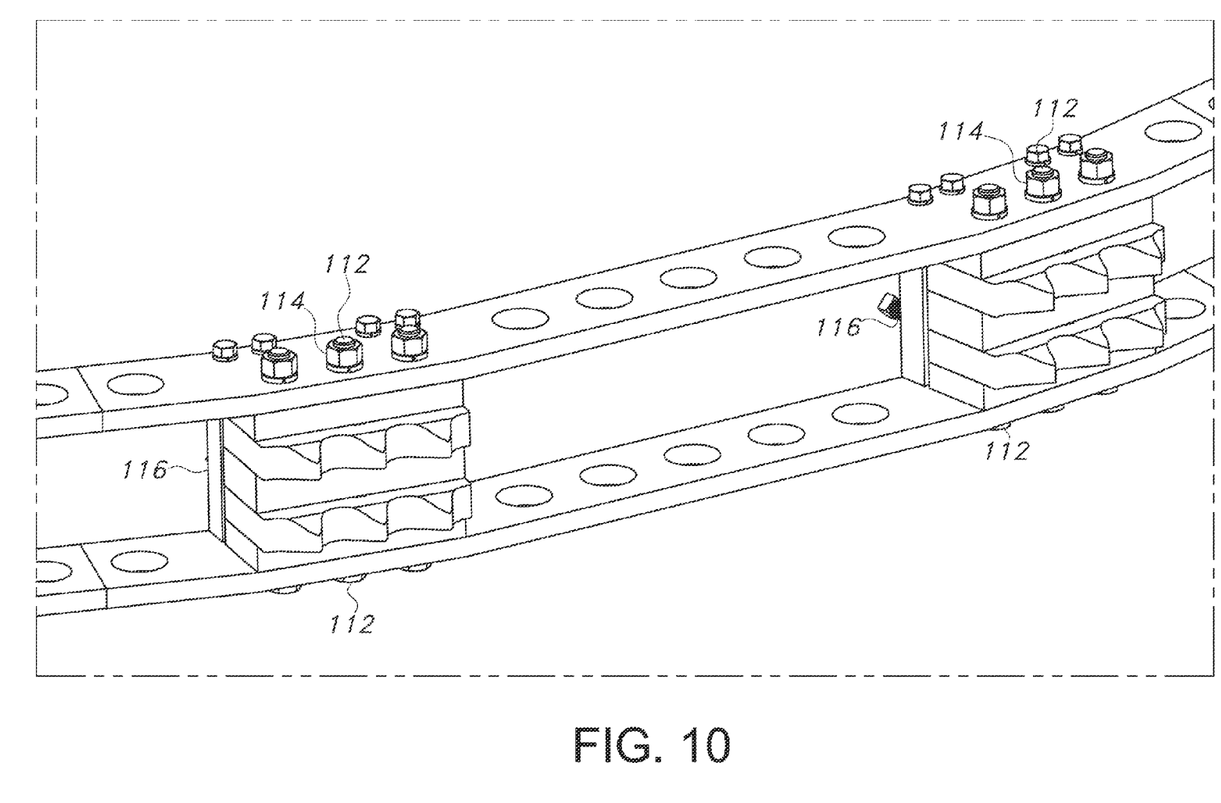
FIG. 10 is an enlarged detail of a tooth segment in accordance with the second embodiment of the present invention.
Figure 11:
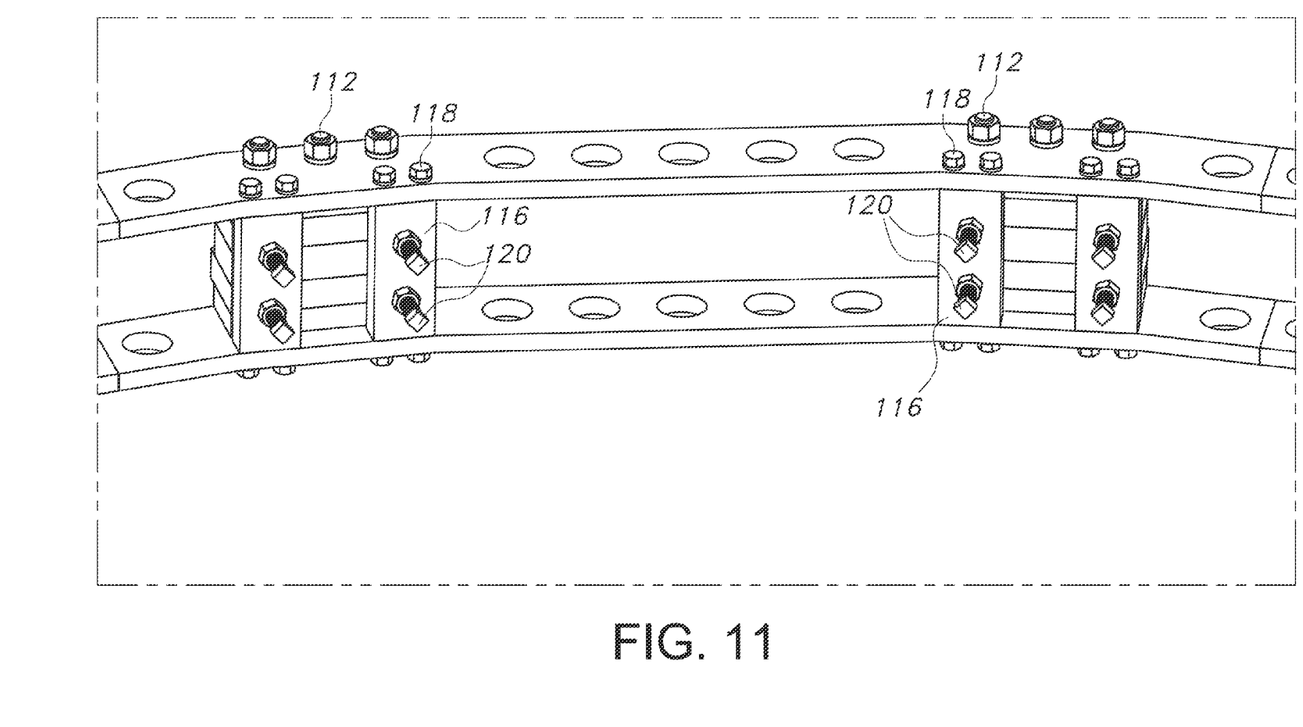
FIG. 11 is an enlarged detail from inside the cage of the second embodiment of the present invention looking radially outward at the jack screw plate and jack screws positioned behind the tooth segment.
Figure 12:
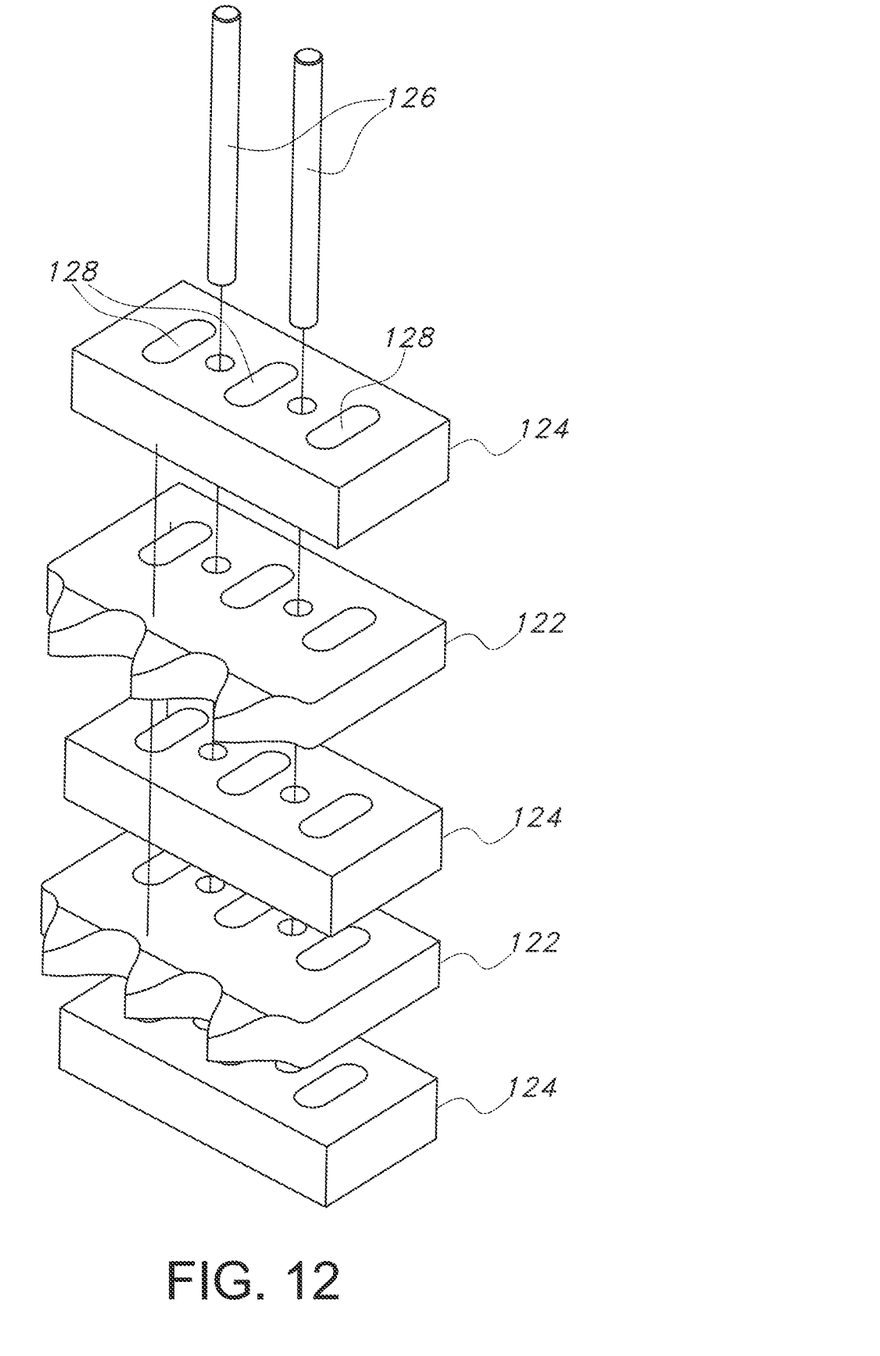
FIG. 12 is an exploded perspective view of a tooth segment formed in accordance with the second embodiment of the present invention.

A second embodiment of the present invention is shown with reference to FIGS. 9 to 12. In the second embodiments, the tooth segments, i.e., tooth segments 100, include two rows of teeth, and are configured to engage what is commonly referred to as a "double row" roller chain (not shown). Tooth segments 100 are preferably captured between a first upper set of pie plates 102, and a second lower set of pie plates 104. As shown in FIG. 9, the pie plates may be secured to the upper and lower surfaces of spokes 106 via bolts 108 and nuts 110. As discussed hereinabove, pie plates 102, 104 are preferably formed using a CNC milling process, or other such accurate manufacturing technology. Each of tooth segments 100 is preferably secured between the opposing set of pie plates by a plurality of bolts 112 and nuts 114. A jack screw plate 116 is positioned radially inward from tooth segment 100, and is secured to the opposing set of pie plates by a plurality of bolts 118. Two sets of jack screws 120 extend through jack plate 116 to allow adjustability of each set of teeth 122. As best seen in FIG. 12, each of tooth segments 100 is preferably formed by stacking two individual teeth 122 and three spacers 124, and thereafter "pinning" these components together via pins 126. Three sets of slotted apertures 128 extend through the individual components to allow for passage of bolts 112 therethrough. The slot allows for adjustment of the combined tooth segment 100 with respect to the opposing set of pie plates 102, 104.

Figure 13:
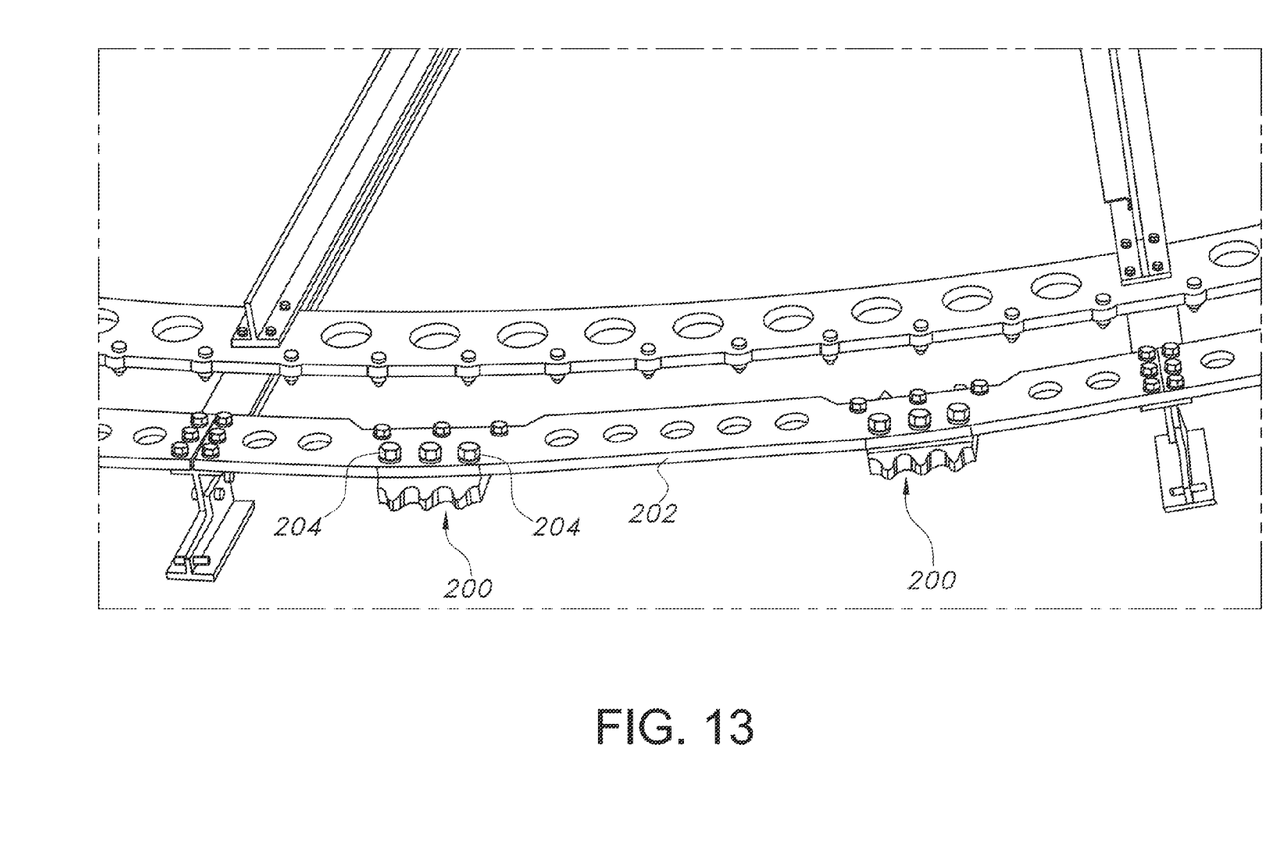
FIG. 13 is a perspective view of a portion of a cage for a spiral conveyor belt system formed in accordance with a third embodiment of the present invention.
Figure 14:
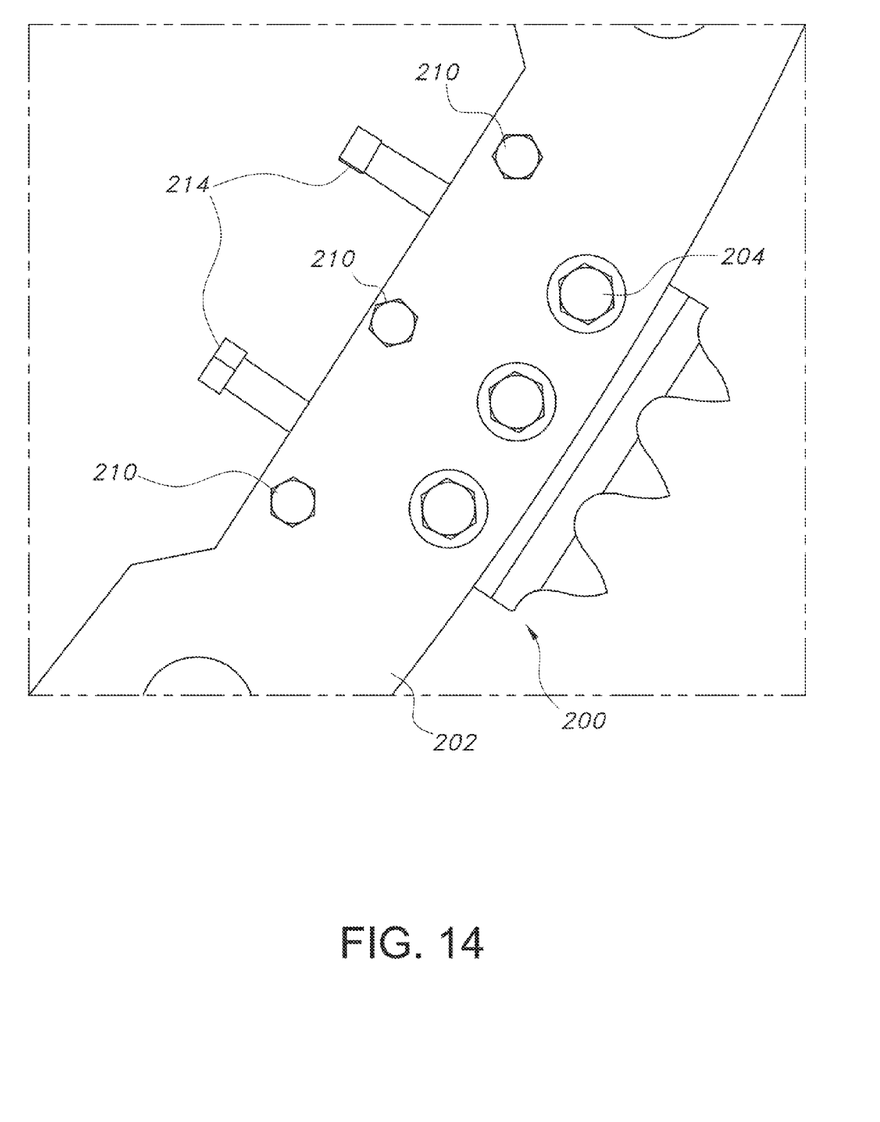
FIG. 14 is an enlarged detail of a tooth segment secured to the pie plates surrounding the circumference of the cage in accordance with the third embodiment of the present invention.
Figure 15:
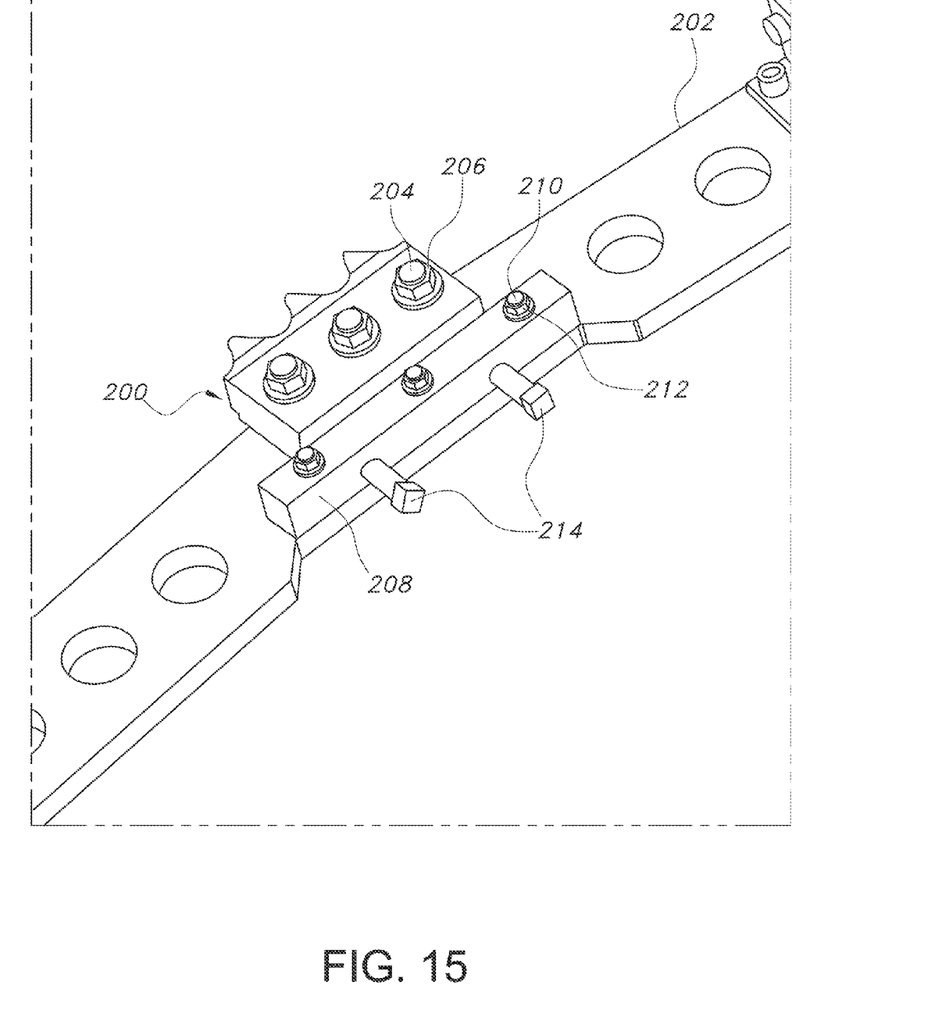
FIG. 15 is a perspective view viewed from the underside of the pie plates showing the positioning of the jack screw plate and jack screws with respect to the tooth segments in accordance with the third embodiment of the present invention.

In another embodiment of the present invention, as shown in FIGS. 13 to 15, tooth segments 200 are secured to the underside of a set of circumferentially extending pie plates 202. Each of tooth segments 200 includes three slotted apertures (not shown) for receipt of three bolts 204, which together with nuts 206, secure the tooth segments to the pie plates. As best seen in FIG. 15, a jack plate 208 is secured radially inward from each of tooth segments 200. Jack plates 208 are secured to the underside of pie plates 202 by a plurality of bolts 210 and nuts 212. A set of jack screws 214 extends through each of the jack plates to provide for adjustability of the adjacent tooth segment 200.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included in the scope of the present invention.

What is claimed is:

1. A drive mechanism for a cage in a spiral conveyor belt system, comprising:
    a motor;
    a roller chain communicating with said motor and extending around said cage;
    a plurality of discreet pie plates secured to said cage and defining a drive ring, each of said pie plates forming a discreet circumferential arc segment, wherein said plurality of pie plates are butted together end-to-end to form a substantially accurate and true circle;
    a plurality of tooth segments secured to said drive ring, each of said tooth segments having a plurality of drive teeth sized to engage said chain, said tooth segments being positioned to define a substantially constant pitch diameter, and each of said tooth segments being independently radially adjustable with respect to said drive ring for varying said pitch diameter.

2. The drive mechanism according to claim 1, wherein each of said pie plates is formed via a CNC milling process.

3. The drive mechanism according to claim 1, wherein said pie plates include a plurality of apertures extending therethrough for bolting said pie plates to said cage.

4. The drive mechanism according to claim 1, wherein each of said tooth segments includes a plurality of slotted apertures extending therethrough, said tooth segments being bolted to said pie plates.

5. A drive mechanism for a cage in a spiral conveyor belt system, comprising:
    a motor;
    a roller chain communicating with said motor and extending around said cage;
    a plurality of discreet pie plates positioned adjacent each other and arranged in a substantially circular format about said cage, said pie plates being secured to said cage and defining a drive ring;
    a plurality of tooth segments secured to said drive ring, each of said tooth segments having a plurality of drive teeth sized to engage said chain, said tooth segments being positioned to define a substantially constant pitch diameter, and wherein each of said tooth segments includes a plurality of slotted apertures extending therethrough, said tooth segments being bolted to said pie plates; and
    a plurality of jack blocks, one of said jack blocks being associated with each of said tooth segments, each of said jack blocks being located adjacent and radially inward from one of said tooth segments, each of said jack blocks being secured to said drive ring and including jack screws for contacting and adjusting the positioning of said tooth segments whereby the trueness of said pitch diameter around said cage is facilitated.

6. The drive mechanism according to claim 5, wherein said drive ring defines a segmented pathway around said cage, and wherein said tooth segments extend from said drive ring whereby said chain extends between adjacent tooth segments without contacting said drive ring or said cage, each of said tooth segments being independently radially adjustable with respect to said drive ring for varying said pitch diameter.

7. The drive mechanism according to claim 5, wherein said drive ring includes a mounting surface which is substantially perpendicular to the circumference of said cage, said tooth segments and said jack blocks being secured to said mounting surface.

8. A drive mechanism for a cage in a spiral conveyor belt system, comprising:
  a motor;
  a roller chain communicating with said motor and extending around said cage;
  a drive ring extending around said cage;
  a plurality of tooth segments secured to said drive ring, each of said tooth segments having a plurality of drive teeth sized to engage said chain, said tooth segments being positioned to define a substantially constant pitch diameter, wherein said drive ring defines a segmented pathway around said cage, and wherein said tooth segments extend from said drive ring whereby said chain extends between adjacent tooth segments without contacting said drive ring or said cage, each of said tooth segments being independently radially adjustable with respect to said drive ring for varying said pitch diameter.

9. A drive mechanism for a cage in a spiral conveyor belt system, comprising:
  a motor;
  a roller chain communicating with said motor and extending around said cage;
  a drive ring extending around said cage;
  a plurality of tooth segments secured to said drive ring, each of said tooth segments having a plurality of drive teeth sized to engage said chain, said tooth segments being positioned to define a substantially constant pitch diameter, wherein said drive ring defines a segmented pathway around said cage, and wherein said tooth segments extend from said drive ring whereby said chain extends between adjacent tooth segments without contacting said drive ring or said cage; and
  a plurality of jack blocks, one of said jack blocks being associated with each of said tooth segments, each of said jack blocks being located adjacent and radially inward from one of said tooth segments, each of said jack blocks being secured to said drive ring and including jack screws for contacting and adjusting the positioning of said tooth segments whereby the trueness of said pitch diameter around said cage is facilitated.

10. The drive mechanism according to claim 9,
  wherein said roller chain comprises a double-row roller chain communicating with said motor and extending around said cage; and
  wherein said drive ring comprises a plurality of discreet upper pie plates positioned adjacent each other and arranged in a substantially circular format about said cage, a plurality of discreet lower pie plates positioned adjacent each other and arranged in a substantially circular format about said cage, said pie plates being secured to said cage; and
  wherein said plurality of tooth segments are secured between said upper and lower pie plates.

11. The drive mechanism according to claim 10, wherein each of said pie plates is formed via a CNC milling process.

12. The drive mechanism according to claim 10, wherein said pie plates include a plurality of apertures extending therethrough for bolting said pie plates to said cage.

13. The drive mechanism according to claim 10, wherein each of said tooth segments includes a plurality of slotted apertures extending therethrough, said tooth segments being bolted to said pie plates.

14. The drive mechanism according to claim 13, wherein each of said tooth segments includes two individual teeth and three spacers arranged in a stacked configuration and coupled together via a plurality of pins, and wherein said teeth are spaced to engage the rows of said of said chain.

* * * * *